United States Patent Office 2,727,904
Patented Dec. 20, 1955

2,727,904

THERAPEUTICALLY VALUABLE AMINO-SALICYLIC ACID DERIVATIVES

Paul Ochwat, Frankfurt am Main-Fechenheim, Germany, assignor to Cassella Farbwerke Mainkur Aktiengesellschaft, Frankfurt am Main-Fechenheim, Germany, a German company No Drawing. Application April 21, 1954,
Serial No. 424,755

Claims priority, application Germany April 30, 1953

2 Claims. (Cl. 260—396)

This invention relates to therapeutically valuable derivatives of aminosalicylic acid.

I have found that therapeutically valuable aminosalicylic acid derivatives are obtained by reacting a dichloronaphthoquinone, or one of its derivatives, with an aminosalicylic acid. The compounds thus obtained are distinguished especially by a tuberculostatic action and may be used also for the sterilization of surgical instruments or table-ware.

The following example is given to illustrate the invention, the parts being by weight and the temperatures in degrees centigrade.

Example

In 450 parts of distilled water, 33 parts of 2.3-dichloro-1.4-naphthoquinone-5-sulfonic sodium are stirred with 18 parts of p-aminosalicylic sodium at room temperature for several hours. The mass is then heated to 90°, and the solution thus obtained is filtered. On cooling, the condensation product precipitates from the filtrate. The product is separated by filtering and washed with little distilled water. For purification, it may be recrystallized from distilled water. The product thus obtained represents the sodium salt of an acid of the formula:

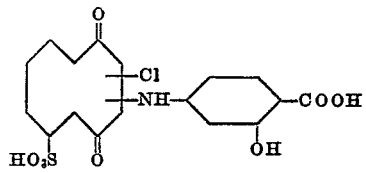

At a dried state, it represents a powder of deeply dark-brown color and is readily soluble in water. Further amounts of the product may be obtained from the filtrate by salting it out.

I claim:
1. A process which comprises reacting 2.3-dichloro-1.4-naphthoquinone-5-sulfonic acid with p-aminosalicylic acid in aqueous solution at a temperature ranging from between ordinary room temperature to the boiling point of the solution.
2. The sodium salt of 2.3-chloro-(4'-carboxy-3'-hydroxy-phenylamino)-1.4-naphthoquinone-5-sulfonic acid.

References Cited in the file of this patent
UNITED STATES PATENTS 2,229,099     Langbein _____ Jan. 21, 1941

OTHER REFERENCES

Claus: Jour. Praktische Chem. (2) 37, 190 (1888).